2,890,129

CEMENT AND PROCESS FOR MAKING SAME

Helmut Georg Kaufmann, Gothenburg, Sweden

No Drawing. Application December 20, 1956
Serial No. 629,442

4 Claims. (Cl. 106—109)

This invention relates to the production of cement-like materials and more particularly relates to the production of cement-like materials from a byproduct of the process of manufacturing hydrofluoric acid.

Hydrofluoric acid is conventionally produced by placing pulverized fluorspar and concentrated sulfuric acid in a retort of platinum or lead and warming the mixture. Hydrogen fluoride passes over as a vapor and is generally led into water to form hydrofluoric acid. The residue remaining in the retort is a calcium sulfate residue which contains considerable quantities of sulfuric acid and unconverted fluorspar. This calcium sulfate residue, as a consequence of its reaction in the hydrofluoric acid process, displays entirely different properties than normal types of gypsum, and therefore cannot be used in the preparation of building material. As a consequence it is considered a waste material and very frequently presents a considerable waste disposal problem.

According to my invention I have now found a process by means of which the residue of the process for producing hydrofluoric acid may be used to produce a high quality synthetic gypsum cement. This material is referred to as a synthetic gypsum cement for the reason that while its chemical formula and color resembles that of gypsum or natural anhydrite, its properties as a building material are entirely different. As an example, with the material produced according to my invention it is possible to form concrete-like construction or building materials having an exceedingly short drying time and having physical properties which surpass the properties of normal types of Portland cement by about 20 to 35%. The material of my invention is referred to as a synthetic gypsum cement for the additional reason that chemicals are added in the course of its production.

I am aware that a previous attempt has been made to produce a concrete from the residues obtained in the production of hydrofluoric acid. However, the process used in this attempt entailed exposing the residue of the hydrofluoric acid process to rain and to the elements for a period of months, and the material produced possessed highly variable properties inasmuch as it often retained large quantities of acid residues. As a result, the process was never used commercially. I am also aware that the calcium sulfate residues of the hydrogen fluoride process have been used as an additive in the manufacture of concrete. In this usage, however, very considerable quantities of other substances are also added, far surpassing the amount of calcium sulfate residue used. As a result, the amount of calcium sulfate residue which can be disposed of in this manner is extremely limited and does not alleviate the residue disposal problem.

I am further aware that another attempt at such a process was made as set out in German Patent No. 706,007. This process, however, never achieved any commercial importance because it entailed burning the mixture at a burning temperature between 350 and 500° C. for a period of at least 2½ hours. This is relatively expensive and results in an overhead cost too high to make the material saleable. The high burning temperature rendered the material similar to known kinds of gypsum and the material could not be mixed with additives such as sand or asbestos. Moreover, the material after mixing with water and subsequent hardening showed an enormous tendency to expand so that concrete-like building material produced therewith cracks when dried.

According to my invention I have now found that an improved cement may be produced from the calcium sulfate residue of the hydrofluoric acid process through a process which is both simple and inexpensive. According to that process I add aluminum sulfate to this residue and then subject the mixture to a steaming step with wet steam at certain temperatures. When this has been done the conventional burning step is eliminated and the material may be dried at relatively low temperatures, crushed and bagged. This steaming step is not to be confused with the relatively low temperature salt dissolving steaming step sometimes used in the past wherein subsequent burning was always necessary.

Accordingly it is the primary object of the present invention to provide a simple and inexpensive process for making a cement-like material from a byproduct of the hydrofluoric acid.

It is another object of the invention to provide a process for making a cement-like material from the calcium sulfate residue of the process of producing hydrofluoric acid which retains in this residue certain characteristics of the calcium sulfate which I have found results in high quality concrete-like materials.

It is another object of the invention to provide a process for producing a synthetic gypsum cement from the residue of the process for producing hydrofluoric acid, wherein ingredients are added either during the course of the process of producing hydrofluoric acid or thereafter.

It is still a further object of the present invention to provide a process for producing a cement-like material from the residue of the process of manufacturing hydrofluoric acid, which cement-like material serves as a substitute for such materials as portland cement in making concrete.

These and further objects and advantages of the invention will become more apparent upon reference to the following detailed description of my invention and the appended claims.

According to my invention the calcium sulfate residue of the process of producing hydrofluoric acid is mixed with 4 to 12% aluminum sulfate by weight. Subsequently this mixture is placed in a container and is exposed to wet steam at a temperature of 200–400° C. It has been found that a preferred steam temperature is about 250–300° C. This wet steam may conveniently be passed into a revolving drum with a perforated axle in which the material is mixed. Suitable agitators may be used to insure proper steam treatment of each particle of the calcium sulfate-aluminum sulfate mixture. During this wet steam treatment the mixture loses the bulk of its remaining free sulfuric acid and thereby receives a white coloring. The duration of this steam treatment depends on the acid content of the residue. Generally, the mixture is exposed to the wet steam treatment for a period of one-half to one hour.

After the end of the steam cleansing process, the material is taken out of the drum in the form of a doughy matter. Burning is not necessary and the material is dried at a normal heating temperature of not more than 195° C. The material may then be mixed with a percentage of fatty acid metallic salts to provide weather proofing. I have found that if calcium stearate is used for this purpose in amounts of 1–3% by weight it acts not only as a weather proofing agent but also as a catalyst to produce an improved concrete forming cement. The mixture then is ground as finely as cement and sacked in paper bags whereupon it is ready for use or sale.

While the foregoing description of my process calls for adding the aluminum sulfate to the residue of the hydrofluoric acid process, my invention also comprehends adding the sulfate during the course of the hydrofluoric acid process. When the sulfate is added during the course of the hydrofluoric acid process it may be added either to the fluorspar prior to the commencement of the action, or may be added during the course of the reaction of the fluorspar with the sulfuric acid.

When the material is ready for use, 8 to 10 weight units of high value lime hydrate may be used for each 100 weight units of water in the formation of concrete. When fatty acid metallic salts are added during the production of the cement, however, the addition of lime hydrates is not necessary since the fatty acid metallic salts act as a catalyst in addition to their water rejecting qualities.

As an example of the use of the material produced according to the foregoing process, concrete-like materials may be mixed according to the following formulas and have been found to possess physical characteristics which exceed those obtained with normal Portland cement:

*Example I*

900 g. cement produced according to foregoing process
900 g. fine sand (0–3 mm.)
1800 g. coarse sand (0–7 mm.)
300 g. water containing about 30 g. slaked lime

*Example II*

900 g. cement produced according to foregoing process
900 g. fine sand (0–3 mm.)
1800 g. coarse sand (0–7 mm.)
320 g. water
3.75 g. calcium stearate As an example of the manufacture of the cement-like material of my invention according to my process, 1,000 weight units of fresh calcium sulfate residue containing 2.5% sulfuric acid was mixed with 70 weight units of aluminum sulfate. This was then agitated and steamed with wet steam for a period of 45 minutes at a temperature of 275° C. The resulting material was dried at 150° C., crushed and bagged.

As stated heretofore, the synthetic gypsum cement produced according to the foregoing process possesses cement-like qualities and is capable of forming a concrete-like material having tensile, flexural, and compressive strength exceeding that of conventional Portland cement. In addition, the shrinkage, drying time, and heat and electricity conductivity are superior to those found in Portland cement. A further advantage of my cement is that it possesses a pure white color. Articles produced through the use of the cement are weather resistant as opposed to ordinary plaster articles which are not. Such articles exposed to weather retain their strength even when exposed to water over a period of weeks. The concrete-like materials produced with the cement of my invention may be reinforced with interlacing iron rods, in the manner of reinforced concrete. In addition to this type of usage for my product, its pure white color and its weather resistance lend it especially for use as stucco, the marking of street and highway signs, and other articles which are continuously exposed to open air. Its favorable coefficient of heat conductivity renders it especially favorable for use as an insulating material. In addition, the material of my invention is also suitable for use as mortar in securing together concrete-like units also made from my material. Since the material exhibits no shrinkage upon drying, it is fit for constructing horizontal surfaces inasmuch as no grooves for expansion are necessary. The material may also be colored through the addition of suitable dye.

This invention may be embodied in other specific compounds and process variations without departing from the spirit or essential characteristics thereof. The process steps disclosed herein are therefore to be considered in all respects as illustrative and not restrictive, the scope of the invention being indicated by the appended claims rather than by the foregoing description, and all compositions and processes which come within the meaning and range of equivalency of the claims are therefore intended to be embraced therein.

I claim:

1. A process for the manufacture of a cement from calcium sulfate residues derived from the production of hydrofluoric acid comprising the steps of adding to said residue aluminum sulfate, exposing said mixture to steam at a temperature of 200–400° C. to remove substantially all free sulfuric acid from the residue, and subsequently heating said mixture to dry it.

2. A process for the production of a cement from calcium sulfate residue derived from the production of hydrofluoric acid comprising the steps of adding to said residue aluminum sulfate, exposing the said mixture to steam at a temperature of 200–400° C. for a time sufficient to remove substantially all free sulfuric acid from the residue, subsequently heating said mixture to dry it, and adding calcium stearate to said mixture.

3. A process for the production of a cement from calcium sulfate residues derived from the production of hydrofluoric acid comprising the steps of adding to said residue 4–12% aluminum sulfate by weight, exposing said mixture to steam at a temperature of 200–400° C. for one-half to one hour, and subsequently heating said mixture to dry it.

4. A process for the production of cement from calcium sulfate residues derived from the production of hydrofluoric acid comprising the steps of adding to said mixture aluminum sulfate, exposing said mixture to steam at a temperature from about 200 to about 400 degrees C. for a time sufficient to remove substantially all free sulfuric acid from the residue, and heating said mixture at a temperature of no more than 195° C. to dry it.

References Cited in the file of this patent

UNITED STATES PATENTS

| | | |
|---|---|---|
| 1,821,961 | Butler | Sept. 8, 1931 |
| 1,970,663 | Lefebrue | Aug. 21, 1934 |
| 2,259,782 | Snell | Oct. 21, 1941 |
| 2,606,127 | Weber | Aug. 5, 1952 |